Oct. 10, 1961     J. REHNER, JR     3,003,938
RADIO-OXONATION OF OLEFINS
Filed April 15, 1957
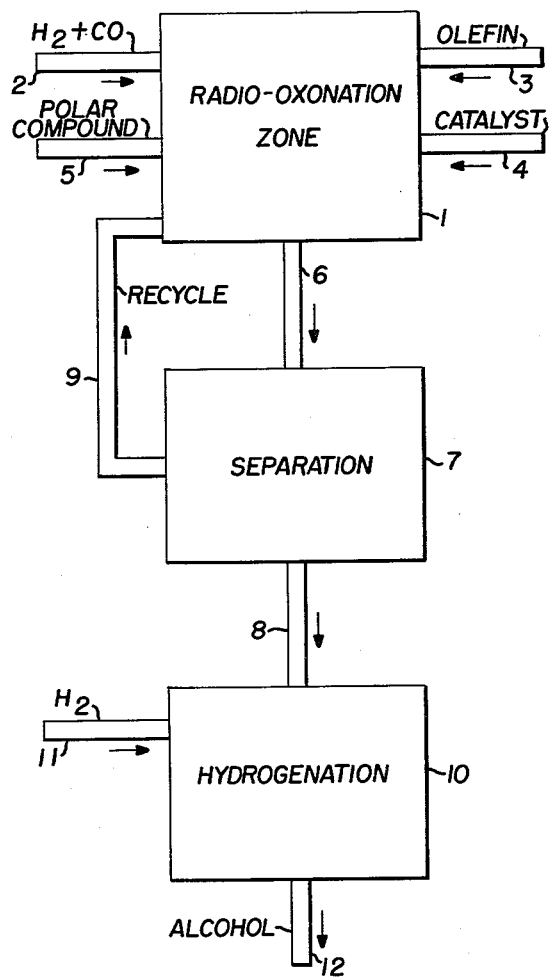
John Rehner, Jr.     Inventor
By L. A. Strimbeck Attorney United States Patent Office 3,003,938
Patented Oct. 10, 1961

3,003,938
RADIO-OXONATION OF OLEFINS
John Rehner, Jr., Westfield, N.J., assignor to Esso Research and Engineering Company, a corporation of Delaware
Filed Apr. 15, 1957, Ser. No. 652,734
2 Claims. (Cl. 204—162)

This invention relates to the radio-oxonation of olefins to obtain oxygenated organic compounds. More specifically, the present invention proposes an improved process for reacting olefins with a synthesis gas comprising carbon monoxide and hydrogen in the presence of a catalyst and high energy radiation.

In brief compass this invention is concerned with a process wherein an olefin is reacted with carbon monoxide and hydrogen in the presence of a salt of a catalytically active heavy metal to obtain an oxygenated organic compound having one more carbon atom than the olefin feed. The improvement of this process, according to the present invention, comprises carrying out the reaction in the presence of at least 0.001 kwh./hr. of high energy ionizing radiation per pound of olefin feed so that the relative induction period is under 60% and the relative reaction rate is over 150%.

The catalytic reaction of olefins with carbon monoxide and hydrogen is well known. This carbonylation or oxygenation reaction (better known as the Oxo process) yields a product which consists predominantly of aldehydes having one more carbon atom than the olefin. See, for example, the general description in U.S. 2,697,731—Nagel. This aldehyde product is usually hydrogenated in a second stage to obtain the corresponding alcohol. The present invention is concerned with the first stage or oxonation step of this process. While irradiation can be used to enhance the hydrogenation step, such radio-hydrogenation does not form a part of the present invention.

It has now been found that when this oxonation reaction is carried out under the influence of high energy ionizing radiation, the induction period is surprisingly decreased and the reaction rate is unexpectedly increased. This invention also advantageously permits the use of lower catalyst concentrations and lower temperatures.

As used in the specification and the claims, "relative induction period" and "relative reaction rate" mean the induction period or reaction rate obtained in the presence of radiation relative to the induction period, or rate obtained in the absence of radiation, all other conditions being the same. Induction period as used herein has its conventional meaning, that is, the length of time under reaction conditions necessary for the reaction to start. Relative induction time equals: induction period with radiation/induction period without radiation. Relative rate of reaction equals: average rate of reaction with radiation/average rate of reaction without radiation.

The following description with reference to the drawing attached to and forming a part of this specification will serve to make this invention clear. The drawing schematically illustrates one embodiment of this invention. For convenience, Table I presented hereinafter summarizes the pertinent operating conditions applicable to the process of this invention.

The radio-oxonation process of this invention is a particularly effective method for preparing valuable alcohols which find large markets, particularly as chemical intermediates, solvents, detergents, and as plasticizers. The olefin feed can comprise long or short chain olefinic compounds of all kinds, depending on the type of alcohol or aldehyde product desired. Straight or branched chain olefins and diolefins, such as propylene, butylene, butadiene, pentene, pentadiene, hexene, heptene, olefin polymers such as di and tri-isobutylene, hexene and heptene dimers, polypropylenes, and hydrocarbon fractions containing such olefins can be used as starting materials. Oxygenated hydrocarbons containing olefinic linkages such as unsaturated acids, ketones, ethers, esters, alcohols, aldehydes, and the like can be used. It is particularly preferred to use terminally unsaturated monoolefins having 2 through 20 carbon atoms per molecule.

The carbonylation catalyst used is usually in the form of a salt of a catalytically active, relatively heavy metal. The salt may be of fatty acid such as stearic, palmitic, oleic, linoleic, naphthenic and similar acids. The preferred metals are cobalt and rhodium, with cobalt being especially preferred. Iron may also be used but it is less effective. The salts are soluble in the liquid olefin feed. They can be supplied to the reaction zone in a hydrocarbon solution but preferably are dissolved in the olefin feed. In some instances, oxides, carbonyls, carbonates, or water-soluble salts of the metals can be employed.

The synthesis gas mixture, carbon monoxide and hydrogen, can be obtained from any convenient source. The ratio of carbon monoxide to hydrogen can vary widely, and the amount of the synthesis gas used can also vary widely.

By high energy ionizing radiation is meant radiation from terrestrial sources consisting of photons having a wave length less than 50 A., such as gamma and X-rays, rapidly moving charged or uncharged particles of an atomic or subatomic nature having an energy above 30 ev., such as alpha particles and beta rays, and neutrons, the radiation being of sufficient intensity such that the dose rate is at least $1\times10^{-3}$ kwh./lb./hr. This excludes radiation such as cosmic and ultraviolet.

The radiation can be obtained from any convenient source such as charged particle accelerators, e.g., Van de Graaff generators; linear accelerators; betatrons; and nuclear reactors, e.g., atomic piles, can be used. Materials from nuclear reactors, e.g., spent fuel elements; and materials made radioactive by insertion in a nuclear reactor, e.g., cobalt 60, can also be used. It is preferred to use gamma or beta irradiation because of their convenience and safety. If the radiation is obtained from a nuclear reactor, it is preferred to shield the reactor so that substantially only gamma radiation is received by the reactants. Although neutrons can be used, their use raises the problem of induced radioactivity.

With reference to the drawing, the synthesis gas, olefin and catalyst are admitted to the radio-oxonation zone 1 by lines 2, 3 and 4 respectively. In some instances it is desirable to use, in addition to the catalyst, polar compounds such as alcohols and ethers and these can be admitted as by line 5. The oxonation reactor 1 can be of any suitable design. When using a radioisotope, the oxo reactants can be simply flowed in, around or through the source to receive the necessary irradiation. The radiation can be supplied externally or internally to the oxonation reaction zone. For example, to obtain gamma irradiation, rods of cobalt 60 suitably clad in a protective coating such as stainless steel or aluminum, can be disposed in the reactor volume with the reactants flowing thereabout. The various conditions of temperature, feed rate and concentration, etc., are adjusted to obtain the conditions specified in Table I.

The products are withdrawn from zone 1 via line 6 and are passed to a separation zone 7 which can, of course, comprise more than one stage. The unreacted gases are withdrawn overhead from the separation zone, and disposed of as desired. The catalyst is caused to separate from the product, e.g., by suitable heat treatment to cause decomposition at about 200 to 400° F., and is removed from the separation zone. The purified product is removed from the separation zone by line 8. If desired, the recovered unreacted synthesis gas mixture and/or a portion of the aldehyde product can be recycled to zone 1 as by line 9.

The contents of line 8 can be withdrawn as product, but preferably they are hydrogenated in zone 10 in a conventional manner to obtain alcohols. Hydrogenator 10 is supplied with hydrogen by line 11, and can be operated at pressures in the range of 2500 to 4500 p.s.i.g., temperature in the range of 300 to 600° F., feed rates in the range of 0.1 to 5 volumes of feed per volume of catalyst per hour (v./v./hr.), and a hydrogen rate in the range of 5,000 to 20,000 standard cubic feet per barrel (s.c.f./bbl.) of feed. Any conventional catalyst can be used such as nickel or cobalt hydrogenation catalysts and molybdenum sulfide, supported on a carrier if desired. The alcohols so obtained are removed from zone 10 by line 12 and further treated as desired. They can be purified and separated, for example, by fractionation to recover substantially pure fractions.

TABLE I $H_2$/CO mole ratio _____ 0.5/1 to 10/1
$H_2$+CO/olefin mole ratio _____ 0.01 to 100
Pressure, p.s.i.a _____ 200 to 10,000
Temperature, °C _____ 60 to 250
Olefin feed rate, v./v./hr _____ 0.2 to 5
Weight percent catalyst (as pure metal), based
 on olefin _____ 0.05 to 2
Polar compound, weight percent based on
 olefin _____ 0 to 250
Dose rate, k.w.h./lb. olefin feed/hr _____ $10^{-3}$ to 10
 (Approximate equivalent for gamma rays,
 expressed as megaroentgens/hr.) (1 to 1,000)
Total dose, k.w.h./lb. olefin feed _____ $10^{-3}$ to 10
Relative induction period, percent, less than __ 60
Relative reaction rate, percent, greater than __ 150

*Example 1*

Propylene was oxonated in the presence of a cobalt carbonyl catalyst. The reaction was carried out in a 3-liter stainless steel bomb with a mechanical rocker. Two experiments were run, one with cobalt carbonyl catalyst alone and the other with cobalt carbonyl catalyst plus radiation. In all other respects the reaction conditions were the same. The bomb was charged with 500 ml. hexane, 15 ml. hexane solution of $Co_2(CO)_8$ catalyst which contained 1.64% Co, 500 p.s.i. propylene (about 200 g.), and 1750 p.s.i. CO/$H_2$ (1:1 mole ratio). In the experiment with radiation, a $Co^{60}$ pipe source of gamma radiation was attached to the top of the rocker (distance between centers of source and bomb=15.2 cm., dosage =32,000 roentgens per hour). The reaction was carried out at about 135° C., and 3100 p.s.i.g. After the pressure had dropped to a constant value, the product was directly hydrogenated employing 80 ml. copper chromite catalyst, a control temperature of 145° C. and about 3300 p.s.i. hydrogen. After distillation of the hydrogenated product, the alcohol content was found by hydroxyl determination and the isomer distribution by gas chromatography. The data below gives a comparison of the two experiments.

TABLE II

| | Co Catalyst Alone | Co Catalyst Plus Radiation (0.3 Megaroentgens) |
|---|---|---|
| Induction period (hrs.) | 7 | 4 |
| Reaction time (hrs.) | 1½ | ¾ |
| Temperature: | | |
|   initial _____°C | 137±6 | 135±4 |
|   maximum _____°C | 149 | 186 |
|   rise _____°C | 12 | 51 |
| Pressure: | | |
|   initial (p.s.i.g.) | 3,150 | 3,100 |
|   final (p.s.i.g.) | 1,400 | 1,000 |
|   drop (p.s.i) | 1,750 | 2,100 |
| Product after oxonation: | | |
|   Volume (ml. product+hexane) | 850 | 850 |
|   Conversion (Wt. percent based on propylene)[1] | 135 | 135 |
| Alcohol product after hydrogenation and distillation: | | |
|   Selectivity (Wt. alcohol[2]÷wt. total product before hydrogenation and distillation) | 0.67 | 0.74 |
|   Yield of alcohol (Wt. percent of propylene) | 92 | 101 |
|   Isomer distribution (normal/iso) | 56/44 | 50/50 |
| Relative induction period _____ percent | | 57 |
| Relative reaction rate _____do | | 179 |

[1] Assuming a product density of 0.82 g./ml.
[2] Corrected for losses on handling.

*Example 2*

448.5 grams (4.58 moles) of heptene-1 (boiling point 94.4° C.—fractionated through a 35 plate Oldershaw column) were reacted with 5.88 moles each of CO and $H_2$. The reaction was in the presence of 507.0 grams (8.45 moles) of isopropanol (technical) and 85.9 grams of a $(Co(CO)_4)_2$ solution in hexane. This cobalt catalyst was preformed by treating cobalt oleate with 3500 p.s.i.g. CO and hydrogen while in a hexane solvent at 160° C.

The reactions were performed in a 3-liter bomb that was secured in a portable rocker equipped with a heating jacket. The cobalt 60 source was clipped on to the top of the rocker. The dosage was about $3.08 \times 10^4$ R./hr. Both the control experiment and the radiation experiment were maintained at about the same temperature.

The progress of the reactions was followed by noting the decrease in pressure of the system. The initial time for both reactions was taken at the time at which 79.1° C. was reached. In both reactions the heat input was stopped at 12.5 hours. After cooling to room temperatures, both bombs were vented slowly and an exit gas sample was collected. By the use of gas chromatography, mass spectrometry, and bromine number analysis, distribution of components in the reaction mixture was determined. The results of these experiments are given in Table III.

TABLE III

| | Control | Plus Radiation |
|---|---|---|
| Induction period, min | 150 | 30 |
| Reaction time, min | 750 | 750 |
| Temperature, °C.: | | |
|   initial | 79.1 | 79.1 |
|   final | 79.1±0.2 | 79.1±0.2 |
| Pressure, p.s.i.g.: | | |
|   initial | 3,600 | 3,600 |
|   final | 2,300 | 1,650 |
| Product w/o hydrogenation: | | |
|   Volume, ml. (+isopropanol) | 1,400 | 1,400 |
|   Conversion (mole percent on heptene) | 52 | 80 |
|   Isomer distribution (normal/iso) | 74 | 74 |
| Relative induction period _____ percent | | 20 |
| Relative reaction rate _____do | | 178 |

The ratio of normal aldehyde to branched aldehydes was not appreciably influenced by the radiation. Infrared spectra of the vented gases did not show any difference between the two runs and this precludes the possibility that radiation induces the decomposition of the product or reactants.

Having described this invention, what is sought to be protected by Letters Patent is succintly set forth in the following claims.

What is claimed is:

1. A process which comprises reacting a terminally unsaturated monoolefin having in the range of 2 through 20 carbon atoms per molecule with 0.01 to 100 moles of carbon monoxide and hydrogen in the presence of 0.05 to 2 weight percent of a carbonylation catalyst comprising the salt of a metal selected from the group consisting of cobalt, rhodium and iron, and in the presence of high energy ionizing radiation at a dose rate above $10^{-3}$ kwh./hr./lb. of olefin feed, at a pressure in the range of 200 to 10,000 p.s.i.a., and at a temperature in the range of 60° to 250° C., until $10^{-3}$ to 10 kwh. of radiant energy per pound of olefin feed have been absorbed, the relative induction period being less than 60% and the relative reaction rate being greater than 150%, and separating an oxygenated product having one more carbon atom than said monoolefin.

2. A process which comprises reacting about 4.5 moles of heptene-1 with 5.8 moles each of carbon monoxide and hydrogen in admixture with isopropanol as a solvent and a cobalt carbonyl catalyst, the reaction being carried in the presence of gamma radiation obtained from cobalt 60 at a dosage of about $3.08 \times 10^4$ R./hr., a temperature of about 79° C., an initial pressure of about 3600 p.s.i.g., an induction period of about 30 minutes, and a relative reaction rate of about 178%, continuing the irradiation for about 750 minutes until the mole conversion of said heptene is about 80%, and then recovering an aldehyde product.

References Cited in the file of this patent
UNITED STATES PATENTS

| | | |
|---|---|---|
| 2,680,763 | Brubaker | June 8, 1954 |
| 2,697,731 | Nagel | Dec. 21, 1954 |
| 2,743,223 | McClinton et al. | Apr. 24, 1956 |

FOREIGN PATENTS

| | | |
|---|---|---|
| 309,002 | Great Britain | Apr. 2, 1929 |
| 714,843 | Great Britain | Sept. 1, 1954 |

OTHER REFERENCES

Sun: Modern Plastics, September 1954, vol. 32, No. 1, pages 141–144, 146, 148, 150, 229–233, 236–238.